(12) United States Patent
Herta

(10) Patent No.: US 8,495,664 B2
(45) Date of Patent: Jul. 23, 2013

(54) SYSTEM, METHOD AND PROGRAM PRODUCT FOR INVOKING A REMOTE METHOD

(75) Inventor: Benjamin W. Herta, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 1680 days.

(21) Appl. No.: 11/160,697

(22) Filed: Jul. 6, 2005

(65) Prior Publication Data

US 2007/0011691 A1    Jan. 11, 2007

(51) Int. Cl.
*G06F 13/00*    (2006.01)

(52) U.S. Cl.
USPC ............................................ 719/330

(58) Field of Classification Search
USPC ..................... 719/328, 330–332
See application file for complete search history.

(56) References Cited

U.S. PATENT DOCUMENTS

| | | | | |
|---|---|---|---|---|
| 5,497,463 | A * | 3/1996 | Stein et al. ................. | 709/203 |
| 5,887,172 | A * | 3/1999 | Vasudevan et al. ........... | 719/328 |
| 6,230,312 | B1 * | 5/2001 | Hunt .......................... | 717/108 |
| 6,260,077 | B1 | 7/2001 | Rangarajan et al. | |
| 6,446,137 | B1 * | 9/2002 | Vasudevan et al. ........... | 719/330 |
| 6,493,768 | B1 * | 12/2002 | Boutcher .................... | 719/330 |
| 2002/0032803 | A1 * | 3/2002 | Marcos et al. ................ | 709/315 |
| 2003/0037174 | A1 | 2/2003 | Lavin et al. | |
| 2003/0126306 | A1 | 7/2003 | Nikami et al. | |
| 2004/0054640 | A1 | 3/2004 | Reichel et al. | |
| 2004/0187141 | A1 | 9/2004 | Tobin | |
| 2004/0221017 | A1 * | 11/2004 | Yoon .............................. | 709/217 |
| 2004/0226022 | A1 | 11/2004 | Prabhu | |
| 2004/0243693 | A1 | 12/2004 | Beisiegel et al. | |

OTHER PUBLICATIONS

Ramirez, S. et al., "OLEBridge for Java," IBM Research Disclosure No. 445133, May 2001, pp. 840-842.

* cited by examiner

*Primary Examiner* — S Sough
*Assistant Examiner* — Phuong Hoang
(74) *Attorney, Agent, or Firm* — Wenjie Li; Hoffman Warnick LLC

(57) ABSTRACT

The present invention provides a method, system and program product for invoking a remote method. Specifically, the invention provides an interface method object that may be used to map an application interface method call to a remote method call. The interface method object may be generated by retrieving an interface description for the remote method and using the interface description, including any necessary parameters determined from the interface description, to generate the interface method call. The interface method object may be generated dynamically at system runtime. The interface method object facilitates invocation of a remote method by mapping an interface method call from an application in interface method object format to a remote method call in the format of the remote method. Because the interface method call is in an interface method object format, changes to the underlying remote method do not affect the application's interface method call.

14 Claims, 3 Drawing Sheets

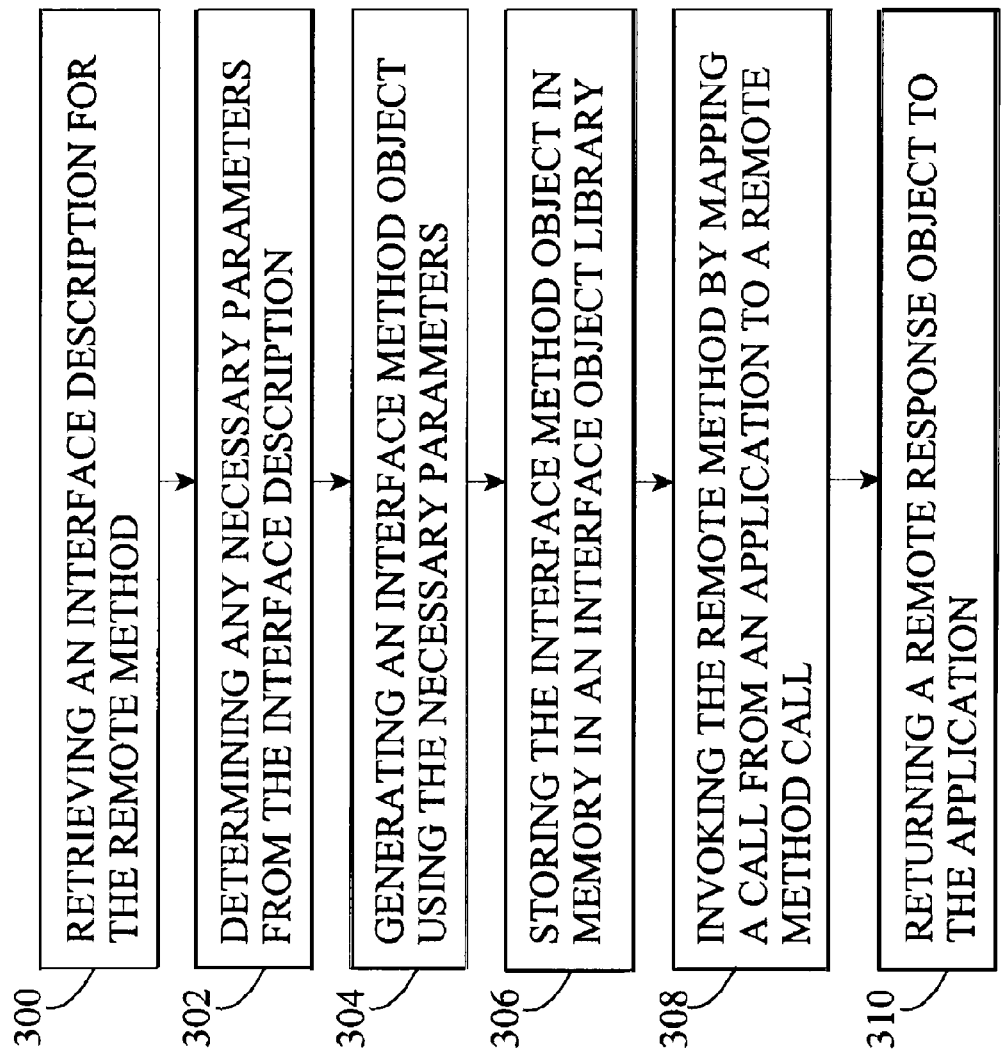

SYSTEM, METHOD AND PROGRAM PRODUCT FOR INVOKING A REMOTE METHOD

BACKGROUND OF THE INVENTION

1. Technical Field

The present invention relates generally to remote method invocation and more particularly to a method, system and program product for invoking remote methods without having to modify the application calling a remote method when the remote method changes.

2. Related Art

In today's computing environment, it is desirable that systems be able to communicate with one another even if the applications on these systems use different programming languages. Communication between different applications on different servers over a network is often done via a process known generically as remote method invocation. Remote method invocation is especially applicable in the realm of object-oriented programming. Today there are several protocols that allow direct communication between different object-oriented applications across a network. Examples include Common Object Request Broker Architecture (CORBA) and Java Remote Method Invocation (RMI).

In enabling communications between different applications on different servers, both CORBA and Java RMI predefine remote objects and remote methods, which are shared by the applications. However, remote methods are sometimes added, modified and deleted. In addition, remote objects may be added or removed. When these changes occur, the applications using the remote objects must be modified, tested, and redeployed together to make sure that they perform correctly with the changed remote methods and remote objects. The process of modifying, testing and redeploying code in response to changes in the remote objects and remote methods may be costly in terms of both programmer time and in time that the affected systems must be off-line in order to complete the process.

What is needed is a method of invoking a remote method that does not require the applications to be changed in response to a change in the remote method.

SUMMARY OF THE INVENTION

The present invention provides a method, system and program product for invoking a remote method. Specifically, the invention provides an interface method object that may be used to map an application interface method call to a remote method call. The interface method object may be generated by retrieving an interface description for the remote method and using the interface description, including any necessary parameters determined from the interface description, to generate the interface method object. The interface method object may be generated dynamically at system runtime and may be stored in a storage system that includes the interface method data. The interface method object may also include default parameters that correspond to parameters of the retrieved interface description. The interface method object facilitates invocation of a remote method by mapping an interface method call from an application in interface method object format to a remote method call in the format of the remote method. Because the interface method call is in an interface method object format, changes to the underlying remote method do not affect the application's interface method call. Furthermore, the default parameters in the interface method object allow the application to invoke the remote method by supplying the interface method call with less than all of the parameters that would have to be used if the call were made directly to the remote method.

A first aspect of the invention is directed to a computer implemented method for invoking a remote method, the method comprising: retrieving an interface description for the remote method; determining any necessary parameters from the interface description; generating an interface method object using the any necessary parameters; and invoking the remote method by mapping an interface method call from an application in a format of the interface method object to a remote method call in a format of the remote method.

A second aspect of the invention includes a remote method invocation system, the system comprising: means for retrieving an interface description for the remote method; means for determining any necessary parameters from the interface description; means for generating an interface method object using the any necessary parameters; and means for invoking the remote method by mapping an interface method call from an application in a format of the interface method object to a remote method call in a format of the remote method.

A third aspect of the invention related to a program product stored on a computer-readable medium, which when executed, invokes a remote method, the program product comprising: program code for retrieving an interface description for the remote method; program code for determining any necessary parameters from the interface description; program code for generating an interface method object using the any necessary parameters; and program code for invoking the remote method by mapping an interface method call from an application in a format of the interface method object to a remote method call in a format of the remote method.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein:

FIG. 3 depicts a flow chart according to one embodiment of the present invention.

DETAILED DESCRIPTION

The present invention provides a method, system and program product for invoking a remote method. Specifically, the invention provides an interface method object that may be used to map an application interface method call to a remote method call. The interface method object may be generated by retrieving an interface description for the remote method and using the interface description, including any necessary parameters determined from the interface description, to generate the interface method object. The interface method object may be generated dynamically at system runtime and may be stored in a storage system that includes the interface method data. The interface method object may also include default parameters that correspond to parameters of the retrieved interface description. The interface method object facilitates invocation of a remote method by mapping an interface method call from an application in interface method object format to a remote method call in the format of the remote method. Because the interface method call is in an interface method object format, changes to the underlying remote method do not affect the application's interface method call. Furthermore, the default parameters in the interface method object allow the application to invoke the remote method by supplying the interface method call with less than all of the parameters that would have to be used if the call were made directly to the remote method.

Figure 1:
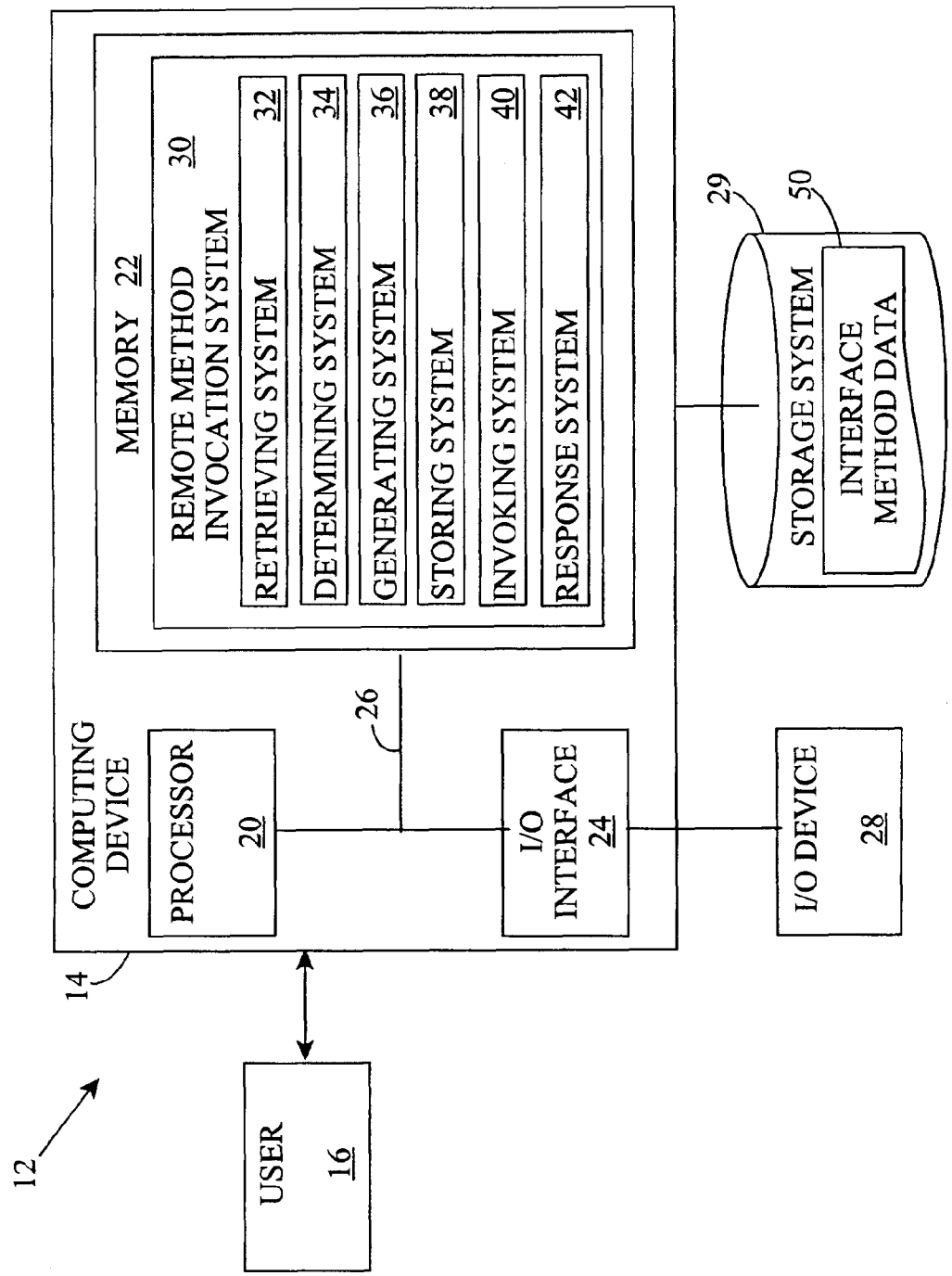
FIG. 1 depicts a block diagram of a computer system having a system for invoking a remote method in accordance with one embodiment of the present invention.

With reference to the accompanying drawings, FIG. 1 is a block diagram of a remote method invocation system 30 in accordance with one embodiment of the invention. In one embodiment, system 30 may be implemented on computer system 12 as computer program code. To this extent, computer system 12 is shown including a memory 22, a processor 20, an input/output (I/O) interface 24, and a bus 26. Further, computer system 12 is shown in communication with an external I/O device/resource 28 and a storage system 29. In general, processor 20 executes computer program code, such as system 30, that is stored in memory 22 and/or storage system 29. While executing computer program code, processor 20 can read and/or write data to/from memory 22, storage system 29, and/or I/O device 28. Bus 26 provides a communication link between each of the components in computer system 12, and I/O device 28 can comprise any device that enables user to interact with computer system 12 (e.g., keyboard, pointing device, display, etc.).

Alternatively, a user can interact with another computing device (not shown) in communication with computer system 12. In this case, I/O interface 24 can comprise any device that enables computer system 12 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer system 12) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer system 12 is only representative of various possible combinations of hardware and software. For example, processor 20 may comprise a single processing unit, or be distributed across one or more processing units in one or more locations, e.g., on a client and server. Similarly, memory 22 and/or storage system 29 may reside at one or more physical locations. Memory 22 and/or storage system 29 can comprise any combination of various types of computer-readable media and/or transmission media including magnetic media, optical media, random access memory (RAM), read only memory (ROM), a data object, etc. I/O interface 24 can comprise any system for exchanging information with one or more I/O devices. Further, it is understood that one or more additional components (e.g., system software, math co-processor, etc.) not shown in FIG. 1 can be included in computer system 12. To this extent, computer system 12 can comprise any type of computing device such as a network server, a desktop computer, a laptop, a handheld device, a mobile phone, a pager, a personal data assistant, etc. However, if computer system 12 comprises a handheld device or the like, it is understood that one or more I/O devices (e.g., a display) and/or storage system 29 could be contained within computer system 12, not externally as shown.

Figure 2:
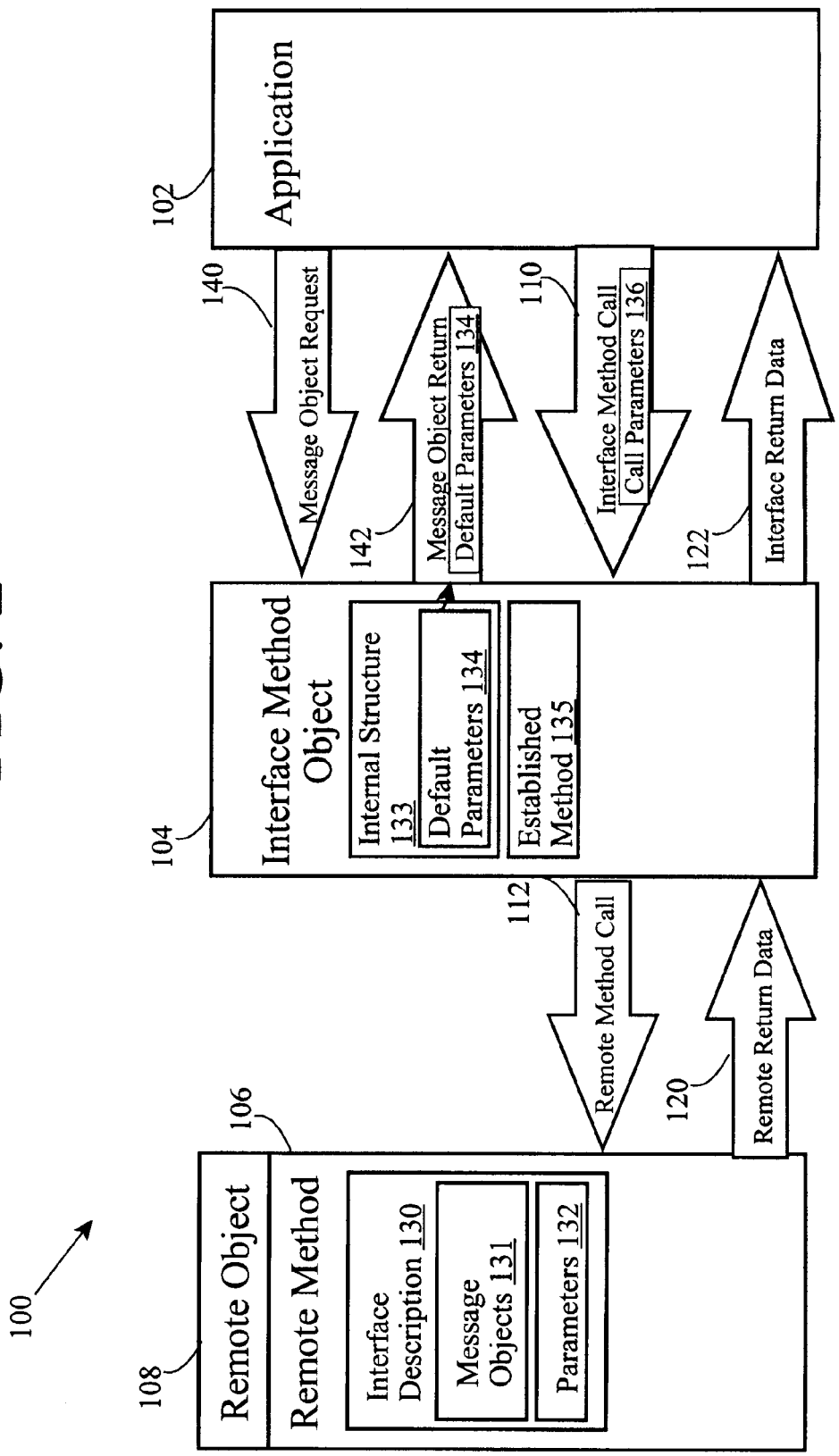
FIG. 2 depicts a block diagram of the invoking step of the present invention.

Referring to FIG. 1 a remote method invocation system 30 is shown in memory 22 of computer system 12 (shown in FIG. 1 as a software product). Referring to FIGS. 1 and 2, remote method invocation system 30 will be described in more detail. Generally, system 30 comprises a method and system for invoking a remote method 106 using an interface method object 104 on computer system 12. Specifically, as shown in FIG. 2, remote method invocation system 30 allows an application 102 to issue an interface method call 110 in the format of interface method object 104. Interface method object 104 then maps interface method call 110 with parameters 136 to a remote method call 112 in the format of remote method 106. Furthermore, remote method invocation system 30 allows remote method 106 to issue remote return data 120 to application 102 by mapping remote return data 120 using interface method object 104 from the format of remote method 106 to an interface return data 122 in the format of interface method object 104. Interface method object 104 allows application 102 to issue calls to remote method 106 without changes having to be made to application 102 in the case that a change is made to remote method 106.

Referring again to FIG. 1 and FIG. 2, collectively, remote method invocation system 30 will be described in greater detail. As depicted in FIG. 1, remote method invocation system 30 generally includes retrieving system 32, determining system 34, generating system 36 and invoking system 40. Remote method invocation system 30 may also include storing system 38 and response system 42, although these systems are optional. Retrieving system 32 provides a way for remote method invocation system 30 to retrieve an interface description 130 for remote method 106 of a remote object 108. Interface description 130 is a component of remote object 108 that specifies available remote objects 108 and remote methods 106 that are available for access by application 102. Interface description 130 may be in the form of a text file or in any other format now known or later developed in the art. Furthermore, interface description 130 may be in an Interface Definition Language (IDL) format or in any other format that lends itself to application 102 retrieving interface description 130 for remote object 108. Interface description 130 may form a portion of remote object 108, such as remote method 106 as illustrated in FIG. 2, or, conversely, may reside separately from remote object 106, such as in storage system 29. Remote object 108, itself, may be in one of several different formats including, but not limited to Common Object Request Broker Architecture (CORBA) and Remote Method Invocation (RMI) Interface.

Interface description 130 of remote method 106 may include necessary parameters 132 to be used by remote method call 112 in calling remote method 106. Determining system 34 provides a way for remote method invocation system 30 to determine some or all necessary parameters 132, if any, from interface description 130 of remote object 108 retrieved by retrieving system 32. Examples of parameters 132 may include an identification of remote object 108, native parameters such as integers, binary arrays and characters, or newly defined objects defined by interface description 130 which are specific to remote object 108. Determining system 34 may then use interface description 130 and parameters 132 to determine interface method object names corresponding to remote method calls 112 for later use by interface method object 104. Both retrieving system 32 and determining system 34 may perform their tasks dynamically at runtime, or, in the alternative, at least one of retrieving system 32 and determining system 34 may perform its task at some other time as required by remote method invocation system 30, including, but not limited to in response to interface method call 110 of application 102.

For example, if application 102 sends a message object request 140 corresponding to remote method 130, retrieving system 32 can read interface description 130 and parameters 132, and determining system 34 can then examine interface description 132 to determine the required message objects 131 and parameters 132 automatically, to be returned to generating system 36 when requested by application 102 on demand. Alternatively, retrieving system 32 can retrieve all remote methods 106 and parameters 132 defined by interface description 130 at startup, and store them in storing system 38, so that when application 102 issues a message object request 140, determining system 34 retrieves the stored remote methods 106, message objects 131 and parameters 132 from storing system 38, to determine remote methods 106, message objects 131 and parameters 132 needed on demand. In an alternative embodiment, retrieving system 32 and determining system 34 process remote methods 106, message objects 131 and parameters 132 defined in interface description 130 at startup, storing the resulting names of message objects 131 and types of needed parameters 132 in storing system 38. In this embodiment, retrieving system 32 and determining system 34 do not need to be invoked when application 102 issues message object request 140 for interface method object 104.

Generating system 36 of remote method invocation system 30 then uses parameters 132 determined using determining system 34 to generate interface method object 104. Interface method object 104 is an object in a generic format that maps an interface method call 110 in the format of interface method object 104 to remote method call 112 in the format of remote method 106. Interface method object 104 may include default parameters 134 for use in mapping interface method call 110 to remote method call 112. Generating system 36 may generate interface method object 104 dynamically at runtime, at the time interface method call 110 is made by application 102, at startup, or at any other time that interface method object 104 is desired.

In one embodiment, generating system 36 may use interface method object 104 to generate at least one internal structure 133 to represent parameters 132 determined by determining system 34, along with default parameters 134. Interface method object 104 generated by generating system 36 may also contain at least one established method 135 to manipulate internal structures 133 for overriding default parameters 134, displaying contents of default parameters 134 and internal structures 133 values, and retrieving values from internal structures 133. Interface method objects 104 may use established methods 135 to isolate remote interface 108, which may undergo periodic changes, from application 102, by converting values and types of call parameters 136 provided by application 102 into the types of parameters 132 required by remote object 108 and defined by interface description 130 and parameters 132.

Storing system 38 may store one or more method objects 104 in interface method data 50 in storage system 29. Interface method data 50 generally comprises one or more interface method objects 104 that may be created by remote method invocation system 30, stored in storage system 29 and sent by invoking system 40 to invoke remote method call 112, as will be described in more detail below. Storage system 29 may include one or more databases/storage devices, such as a magnetic disk drive or an optical disk drive. In another preferred embodiment, storage system 29 includes data distributed across, for example, a local area network (LAN), wide area network (WAN) or a storage area network (SAN) (not shown). Storage system 29 may also be configured in such a way that one of ordinary skill in the art may interpret it to include one or more storage devices. Storing system 38 is optional and, as such, may not be included in a particular embodiment of remote method invocation system 30.

Invoking system 40 of remote method invocation system 30 provides a way for application 102 to invoke remote method 106 using interface method object 104. After application 102 has retrieved message object 142 from interface method object 104, and modified the values of default parameters 134 as necessary, application 102 makes an interface method call 110 on interface 104 to "send" the message object out. Invoking system 40 then, in response to interface method call 110 from application 102, maps call parameters 136, which may include default parameters 134 previously retrieved as well as non-default values (not shown) set by application 102, from interface method call 110 in the format given by application 102, into the format required by remote object 108. Interface method object 104 may ensure that call parameters 136 are of the correct type for use in remote method call 112 through native type conversions. These include, but are not limited to, converting strings into integer values, integer values into floating point values, and so on. In the alternative, any other manner of ensuring type correctness now known or later developed in the art may be used. In any case, the use of interface method object 104 by invoking system 40 to map interface method call 110 to remote method call 112 allows interface method call 110 of application 102 to remain constant even if remote method call 112 changes in response to changes to remote method 106 or remote object 108. Furthermore, because interface method object 104 may include default parameters 134 for all possible parameters 132 in mapping interface method call 110 to remote method call 112, it may not be necessary for application 102 to specify values for all parameters 132 of remote method 130 in call parameters 136. Additionally, as remote methods 106 are changed to add additional parameters 132, or as the format or type of parameters 132 are changed, application 102 will continue to make interface method call 110 correctly, since remote method invocation system 30 ensures that each call parameter 136 in interface method call 110 matches parameters 132 of interface description 132.

Response system 42 of remote method invocation system 30 provides a way for remote method 108 to respond to interface method call 110 of application 102. Response system 42 accomplishes this by using interface method object 104 to map remote return data 120 in the format of remote method 106 to interface return data 122 in the format of interface method object 104. This mapping by response system 42 generates interface return data 122, which may be a message object, having the same format as interface method call 110, sent by application 102. One difference is that interface return data 122 do not have to be generated from interface description 130 and parameters 132, but may instead be generated directly from remote return data 120 that is returned from the call to remote method 106. As such, interface return data 122 does not contain default parameter values 134, but only actual values (not shown) from the returned object. Although response system 42 has been illustrated here as sending remote return data 120 in response to interface method call 110, response system 42 may also use remote method 106 to send remote return data 120 where no corresponding interface method call 110 has previously been made. Remote return data 120 from remote object 108 may be sent to application 102 as incoming message objects. Application 102 optionally may send back a message object response (not shown), which is converted by interface method object 104 into an appropriate return value object (not shown) as required by interface description 130. Response system 42 is optional and may, as such, not be included in a particular embodiment of remote method invocation system 30.

Turning now to FIG. 3, a flow chart of a method according to one embodiment of the present invention is depicted. FIG. 3 will be described with reference to FIGS. 1 and 2. In first step 300, retrieving system 32 of remote method invocation system 30 retrieves interface description 130 from remote method 106. In step 302, determining system 34 determines any necessary parameters 132 from interface description 130. In step 304, generating system generates interface method object 104 using parameters 132 from determining step 302. In step 306, storing system 38 may, optionally, store interface method object 306 generated in step 304 in interface method data 50 of storage system 29. In step 308, invoking system 40 may invoke remote method 106 by using interface method object 104 to map interface method call 110, previously retrieved from interface method object 104, from application 102 in interface method object 104 format to remote method call 112 in remote method 106 format. In step 310, response system 42 may, if required, return remote return data 120 to application 102 by using interface method object 104 to map remote return data 120 in remote method 106 format to interface return data 122 in interface method object 104 format.

It is understood that the order of the above-described steps is only illustrative. To this extent, one or more steps can be performed in parallel, in a different order, at a remote time, etc. Further, one or more of the steps may not be performed in various embodiments of the invention.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., system 30), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A computer implemented method for invoking a remote method, the method comprising:
    retrieving an interface description for the remote method in response to an invocation of the remote method, the interface description being specific to the remote method;
    extracting a set of parameters from the interface description, the set of parameters being any parameters that are necessary for the invocation to be carried out;
    generating an interface method object dynamically at runtime using the set of parameters extracted from the interface description;
    invoking the remote method by mapping, using the interface method object, an interface method call from an application in a format of the interface method object to a remote method call in a format of the remote method, and returning remote return data to the application by mapping, using the interface method object, the remote return data in the format of the remote method to an interface return data in the format of the interface method object.

2. The method of claim 1, wherein the interface description is in an Interface Definition Language (IDL).

3. The method of claim 1, wherein the format of the remote method is selected from the group consisting of Common Object Request Broker Architecture (CORBA) and Remote Method Invocation (RMI).

4. The method of claim 1, further comprising storing the interface method object in memory in an interface object library.

5. The method of claim 1, wherein the interface method object includes at least one default value corresponding to at least one of the any necessary parameters.

6. A remote method invocation system, the system comprising:
    a computer device, having;
    means for retrieving an interface description for the remote method in response to an invocation of the remote method, the interface description being specific to the remote method;
    means for extracting a set of parameters from the interface description, the set of parameters being any parameters that are necessary for the invocation to be carried out;
    means for generating an interface method object dynamically at runtime using the set of parameters extracted from the interface description;
    means for invoking, using the interface method object, the remote method by mapping an interface method call from an application in a format of the interface method object to a remote method call in a format of the remote method, and
    means for returning, using the interface method object, a response to the calling application by mapping the response in the format of the remote method to an interface return data in the format of the interface method object.

7. The system of claim 6, wherein the interface description is in an Interface Definition Language (IDL).

8. The system of claim 6, wherein the format of the remote method is selected from the group consisting of Common Object Request Broker Architecture (CORBA) and Remote Method Invocation (RMI).

9. The system of claim 6, further comprising means for storing the interface method object in memory in an interface object library.

10. The system of claim 6, wherein the interface method object includes at least one default value corresponding to at least one of the any necessary parameters.

11. A program product stored on a non-transitory computer-readable storage medium, which when executed, invokes a remote method, the program product comprising:

program code for retrieving an interface description for the remote method in response to an invocation of the remote method, the interface description being specific to the remote method;

program code for extracting a set of parameters from the interface description, the set of parameters being any parameters that are necessary for the invocation to be carried out;

program code for generating an interface method object dynamically at runtime using the set of parameters extracted from the interface description;

program code for invoking, using the interface method object, the remote method by mapping an interface method call from an application in a format of the interface method object to a remote method call in a format of the remote method, and program code for returning, using the interface method object, a response to the calling application by mapping the response in the format of the remote method to an interface return data in the format of the interface method object.

12. The program product of claim 11, wherein the interface description is in an Interface Definition Language (IDL).

13. The program product of claim 11, wherein the format of the remote method is selected from the group consisting of Common Object Request Broker Architecture (CORBA) and Remote Method Invocation (RMI).

14. The program product of claim 11, further comprising program code for storing the interface method object in memory in an interface object library.

\* \* \* \* \*